Dec. 19, 1939.  W. W. CRILEY  2,183,670
BULLDOZER
Filed Jan. 17, 1938    6 Sheets-Sheet 1

INVENTOR.
WILLIAM W. CRILEY
BY John H. Leonard,
his ATTORNEY.

Dec. 19, 1939.　　　W. W. CRILEY　　　2,183,670
BULLDOZER
Filed Jan. 17, 1938　　　6 Sheets-Sheet 2

Fig. 3

INVENTOR.
WILLIAM W. CRILEY
BY
*John H. Leonard,*
his ATTORNEY.

Dec. 19, 1939.  W. W. CRILEY  2,183,670
BULLDOZER
Filed Jan. 17, 1938  6 Sheets-Sheet 3

INVENTOR.
WILLIAM W. CRILEY
BY
ATTORNEY.

Dec. 19, 1939. W. W. CRILEY 2,183,670
BULLDOZER
Filed Jan. 17, 1938 6 Sheets-Sheet 4

INVENTOR.
WILLIAM W. CRILEY
BY
John H Leonard,
his ATTORNEY.

Fig. 10  Fig. 8

Dec. 19, 1939.　　　W. W. CRILEY　　　2,183,670
BULLDOZER
Filed Jan. 17, 1938　　　6 Sheets-Sheet 6

Fig.9

INVENTOR.
WILLIAM W. CRILEY
BY
ATTORNEY.

Patented Dec. 19, 1939

2,183,670

UNITED STATES PATENT OFFICE 2,183,670

BULLDOZER

William W. Criley, Cleveland, Ohio

Application January 17, 1938, Serial No. 185,260

4 Claims. (Cl. 78—39)

This invention relates generally to improvements in a machine tool of the class known as a "bulldozer" having a heavy reciprocating slide, and more specifically is directed to improvements in certain of the operating or relatively moving parts of such a machine which materially increase its efficiency and accuracy of operation, provide for greater flexibility of control, distribute heavy stresses on critical parts occasioned by the operation of such machines, and thereby decrease wear and the susceptibility of breakage.

For purposes of illustration, the improvements will be shown in connection with a bulldozer, their application for use in other machines having similar parts being readily apparent therefrom.

In well known types of machines of this character, the guiding surfaces for the crosshead or slide are disposed entirely on one side of the axis of rotation of the main eccentric or driving member. This arrangement of the guiding surfaces allowed the slide to tilt upwardly or downwardly with respect to a horizontal plane during its operation upon a work piece. Such tilting resulted in the formation of inaccurate and inconsistent work pieces. Furthermore, this tilting action produced heavy concentrated stresses on portions of the sliding surfaces, thereby causing relatively rapid wear and oftentimes breakage of the parts. In an attempt to reduce this tilting action, the slides of these prior machines were sometimes provided with relatively long bearing surfaces. These surfaces, however, were all positioned on one side of the main eccentric shaft so that the machine required a long and expensive frame and necessitated a large floor space for installation.

Also, in these prior machines, the main driving gears which carry the eccentric for operating the slide were simply keyed onto the end portion of the main shaft which extends beyond the frame. This extended portion of the shaft was necessarily relatively short and its engagement with the hub of the main gear was correspondingly short. Furthermore, its diameter was comparatively small so it would deflect when a load was applied. By reason of such a relatively short engaging surface and the deflection of the shaft, the gears would inherently cock with respect to the axis of the shaft when a load was applied to the slide, causing extremely heavy concentrated stresses to occur between the shaft bearing and the gear, which often resulted in breakage or damage to the parts. Such a mounting furthermore caused improper meshing of the gear teeth and resulted in rapid wear of the teeth.

Again in prior machines the forward and reversing drive has been obtained by mounting a pair of fly wheels and clutches on a single shaft, the fly wheels and clutches being driven through a pair of oppositely disposed bevel ring gears which were carried on the fly wheels. These bevel ring gears were driven in opposite directions by a motor driven bevel pinion disposed between the ring gears and mounted on the motor shaft, and having its axis of rotation extending at right angles to the clutch and fly wheel shaft. In such a drive it was impossible to maintain the bevel gears and pinion in proper mesh under a heavy load, and as a result, frequent replacement of these gears was necessary, which involved a considerable amount of expense and time. Furthermore, this bevel gear drive is very expensive to build.

The forward and reversing clutches were previously controlled through separate and independent operating levers, and unless each lever was operated at the proper time, excessive wear occurred within the clutch parts.

Again, prior bulldozers have either had no brake at all for stopping the machine in a predetermined position, or else a brake which would only function when the forward driving clutch was operating. Such a machine, at best, gave only a limited control over the stroke of the slide. Furthermore, during the operation of some machines in the past, it has been necessary for the operator to manually disengage the clutch after the slide passed the forward dead center and let the machine coast to a stop. Thus, accurate control of the slide could not be obtained.

These and other disadvantages have been overcome by the present invention, as will be seen from the following description.

An important object, therefore, of the present invention lies in the provision of a heavy duty machine having a reciprocating slide and an eccentric drive shaft for operating the slide, the slide having guiding surfaces on opposite sides of the axis of rotation of the eccentric drive shaft to maintain planar movement of the slide at all times.

An equally important object is to provide such a machine, the frame of which, by reason of the arrangement of guiding surfaces for the slide, can be maintained materially shorter in length than the frames of prior machines of equal capacity.

Another important object is to provide an improved bulldozer which will operate more efficiently and more accurately and which can be built and maintained at less cost than prior machines of this character.

A more specific object is to provide an effective mounting of the main eccentric gears onto the main driving shaft so as to more evenly distribute the heavy loads on these parts and thereby reduce wear and eliminate the danger of breakage and misalignment.

Another specific object is to provide an improved forward and reversing drive for a machine of this character which has heretofore been a source of trouble and weakness.

Further specific objects include improved means for controlling and operating the clutch and brake mechanisms either manually or semi-automatically.

Other and further objects will be apparent from a consideration of the following specification and accompanying drawings.

Since all of the advantages of the present invention are best shown in connection with a horizontal operating bulldozer, the description will be specifically limited thereto, although its use in connection with other similar machines having similar parts, with slides operating vertically or on an incline, may be applicable.

Figures 1, 2:
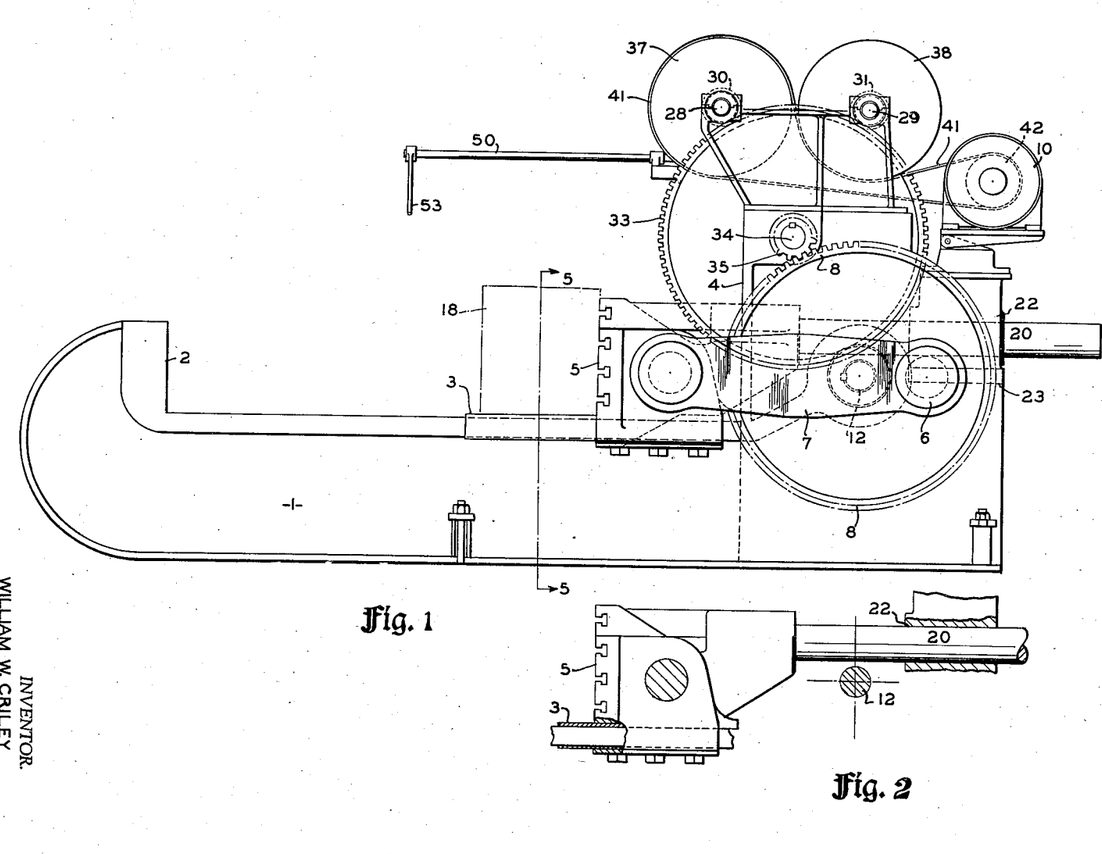
Fig. 1 is a side elevation of a bulldozer embodying the features of the present invention.
Fig. 2 is a side elevation of the slide for the machine showing the relative positions of the bearing surfaces for guiding the slide.

Referring particularly to Figs. 1 to 7, inclusive, the machine used for illustration comprises a horizontal frame 1 with an upwardly directed stationary abutment 2 adjacent the forward end thereof and a pair of laterally spaced upright members having horizontal slide surfaces 3. The rear end of each of the slide surfaces 3 terminates in an upwardly extending frame portion 4, as best shown in Fig. 1. A slide 5 is mounted for constrained horizontal reciprocation on the slide surfaces 3. It will be noted from Figs. 3 and 4 that the dimension of the slide in the direction longitudinally of the frame 1 is much less than the dimension of the slide in the direction transversely of the frame. The slide surfaces 3, as shown in Fig. 1, extend from the upwardly extending portions 4 in a direction forwardly of the machine and terminate at a distance approximately equal to the longitudinal or short dimension of the slide plus the stroke of the slide.

The slide 5 is actuated forwardly and backwardly of the machine along the surfaces 3 through the medium of a pair of laterally spaced power driven eccentrics 6 and connecting rods 7. These eccentrics and connecting rods are mounted on opposite sides of the machine, the crank end of each connecting rod being joined to the associated eccentric, and the opposite end of each rod being connected to a wrist pin on the corresponding side of the slide 5. The eccentrics and connecting rods are driven at the same rate of speed so that opposite sides of the slide are positively driven at the same speed. Thus, the slide is precluded from becoming cocked sideways relative to the guide surfaces 3.

Each of the eccentrics 6 is shown mounted on one side of its associated main drive gear 8, each gear in turn being driven by a motor 10 through a belt drive and a train of gears and pulleys. These main gears are preferably mounted on opposite end portions of a single main drive shaft 12 which extend laterally through and project beyond the opposite sides of the portions 4 of the frame 1. A more detailed description of this gear mounting will be given subsequently.

The slide 5 is preferably located forwardly of the main drive shaft 12, that is, between the drive shaft 12 and the stationary abutment 2. On the lower side of the slide are spaced horizontal bearing surfaces 14 which slide on the surfaces 3. The slide is guided against lateral movement relative to the frame by vertical guide surfaces 13 which engage corresponding surfaces on the frame. The bearing surfaces 14 may be slidably retained in contact with the surfaces 3 by providing removable retaining plates 16 engageable with auxiliary sliding surfaces 17 which in the present instance are shown disposed on the frame directly beneath the surfaces 3.

During operation of the machine, the slide 5 is moved over the surfaces 3 toward the stationary abutment 2 to engage and perform work upon a work piece placed between the abutment and the slide. Unless the slide engages the work squarely, there is a tendency for the forward end of the slide to tilt upwardly or downwardly relative to the surfaces 3. If the slide is allowed to tilt in this manner, as in the case of prior machines of this character, the bearing surfaces become rapidly worn and the operating parts become subjected to extremely heavy loads, causing premature breakage. When an irregular forming die, indicated at 18, is used on the slide, such tilting and wearing is even more prevalent than when a flat die member is used.

In order to prevent this objectionable tilting of the slide with its resultant heavy stresses and wear, a supplemental guiding means is provided in the present invention, which maintains the slide in absolutely parallel positions with respect to the surfaces 3 at all times. This supplemental guiding means, which constitutes one important part of the present invention, will now be described in detail.

Figure 4:
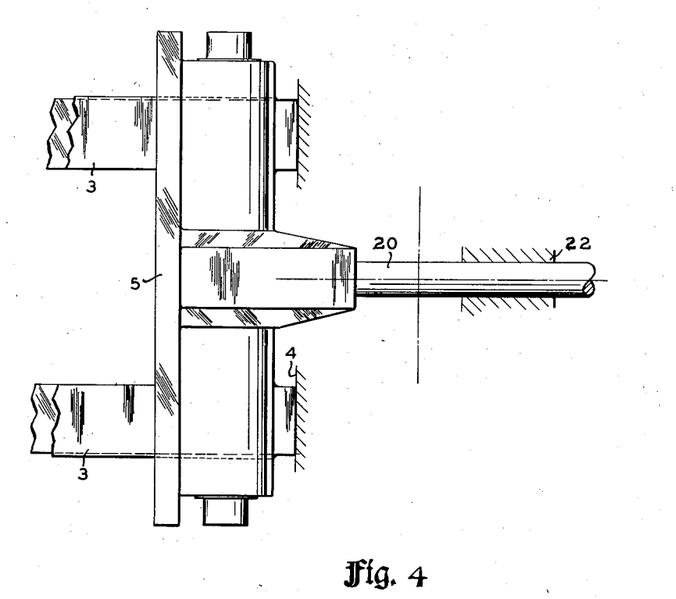
Fig. 4 is a top plan view of the slide illustrated in Fig. 2, showing the relative positions of the guiding surfaces.
Figure 5:
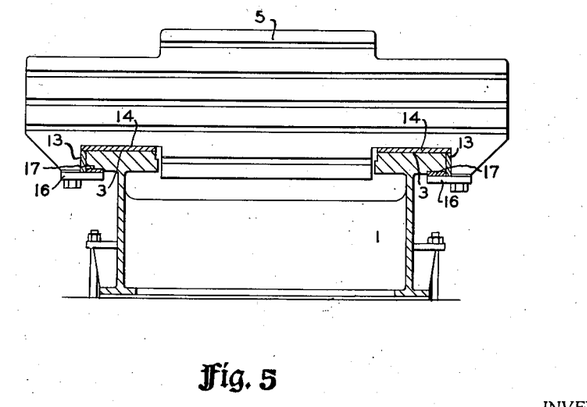
Fig. 5 is a sectional view through the frame of the machine showing bearing surfaces for the slide and is taken substantially on the plane indicated by the line 5—5 of Fig. 1.
Figure 6:
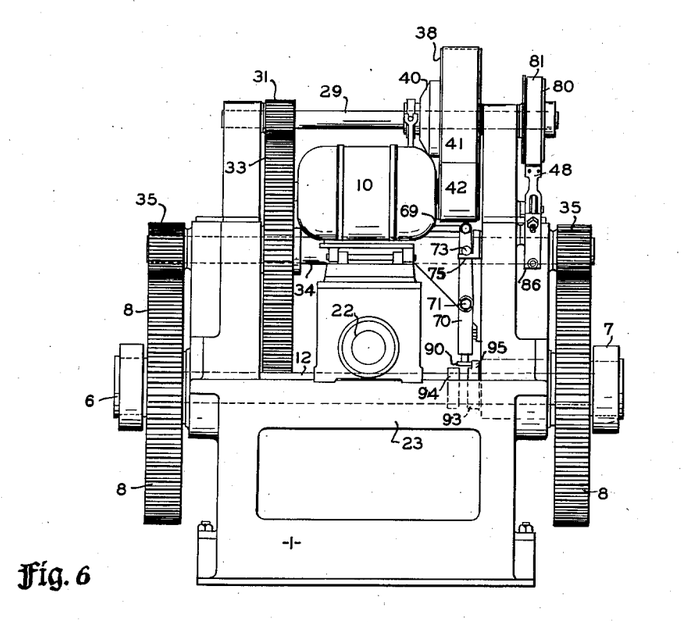
Fig. 6 is a rear end elevation of the machine shown in Figs. 1 and 3.
Figure 7:
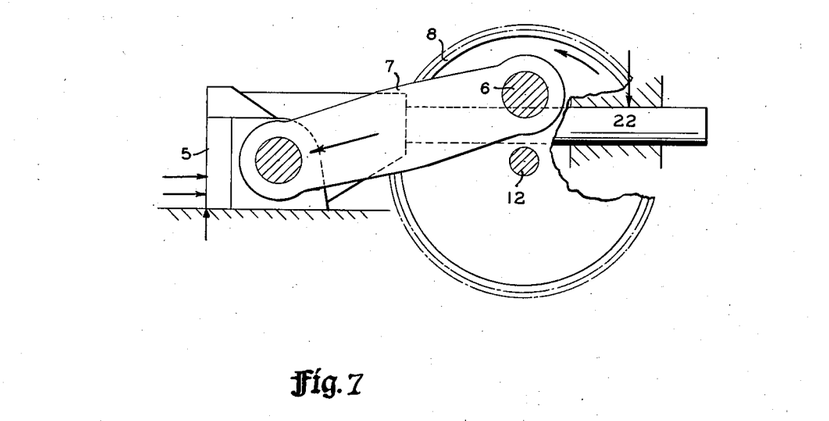
Fig. 7 is a schematic view of the slide, eccentric and bearing surfaces and the forces acting thereon.

Extending horizontally and to the rear of the slide 5 is a large bar 20, which is preferably cylindrical in cross section. This bar is rigidly secured in any suitable manner to the slide at a position substantially midway between the opposite sides thereof, as best shown in Fig. 4. In the present instance, the bar 20 passes above the main shaft 12 and extends to the rear of the machine, that is, on the opposite side of the shaft 12 from the slide 5. It may be desirable in some instances, however, to dispose the bar beneath the main drive shaft. In either instance, however, it is essential that the bar 20 extend toward and beyond the shaft 12.

The bar 20 passes longitudinally through a rigid cylindrical bearing 22 which is mounted on a crown plate 23 and is located to the rear of the main shaft 12, as shown in Figs. 1, 2 and 4. This crown plate bridges the space between the upright frame portions 4 and provides the necessary rigid support for the cylindrical bearing 22. As the slide 5 reciprocates forwardly and backwardly, the bar 20 reciprocates therewith and slides axially with respect to the bearing 22. Thus it will be seen that the slide 5 is constrained from any tilting movement by the guiding action of the bar 20 in cooperation with the bearing surfaces 14 and slide surfaces 3. By placing the bearing 22 on the opposite side of the shaft 12 from the slide 5, the overall guided length of the slide can be materially increased from that of prior machines of the same approximate length, thus providing adequate guiding surfaces to prevent relative tilting of the slide.

In prior machines of this character, all of the guiding surfaces for the slide were located entirely on one side of the main shaft 12, and in many instances the adequate guiding length for the slide was sacrificed.

Figure 9:
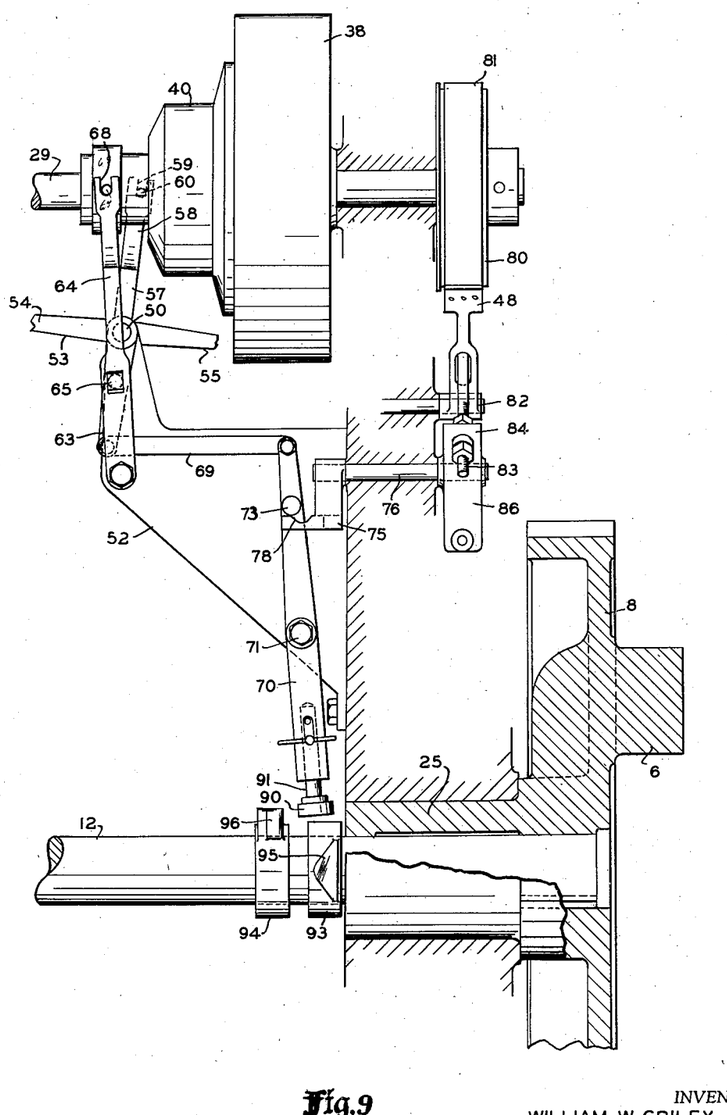
Fig. 9 is a rear end elevation, partly in section, of the clutch and brake operating mechanism, showing the position of levers for engaging the forward driving clutch.

Another important feature of the present invention relates to the mounting of the main eccentric gears 8 relative to the shaft 12 and the frame 1 to more effectively carry the stresses to which a machine of this character is subjected. Each of the main driving gears 8 is provided with an axially extending trunnion portion 25 which is integral with the gear at the hub, as shown in Fig. 9. This trunnion portion is suitably journalled at its outer peripheral surface in the frame of the machine for rotation relative thereto. Each end of the main shaft 12 is joined to its associated gear 8 by passing it through a central axial bore in the gear and trunnion, thus providing a substantial support for the gear in the frame without subjecting the end portion of the shaft to an excessive bending load.

This integral trunnion provides a more rigid construction than prior machines in which the main driving gears were joined directly to that portion of the shaft which projects beyond the sides of the frame. In such a gear mounting, when the load is applied on the eccentric, the gear tends to cock relative to its normal axis of rotation and thereby cause the main driving shaft to be subjected to an extremely heavy bending load which oftentimes results in breakage or misalignment of the shaft and the consequent misalignment of the gears attached thereto and rapid wear of the teeth of the gear.

The trunnion 25 rigidly supports the gear 8 for rotation relative to the frame, and the shaft 12 carries a very small portion of the bending load exerted by the gear when the working load is applied. The trunnion is preferably relatively large in diameter compared to the diameter of the shaft so as to provide adequate resistance to cocking when the working load is applied. The teeth of the gears 8 are thus maintained in accurate meshing relation with the teeth of the driving pinion.

A further important improvement in a machine of this type relates to a more economical and more satisfactory drive for providing the forward and backward movement of the slide. In order to return the slide 5 to its extreme rear position without requiring the eccentric 6 to make a complete revolution, a reversing drive is provided. This reversing drive may be controlled by an operator to cause the slide to move forwardly or backwardly from any position along the stroke of the slide.

The reversing drive comprises a pair of spaced parallel shafts 28 and 29, suitably mounted on the upwardly extending portion 4 of the frame 1. These shafts have mounted thereon driving pinions 30 and 31 respectively, which pinions mesh constantly with a relatively large diameter gear 33. The gear 33 is mounted on a shaft 34 which is disposed between the main shaft 12 and the shafts 28 and 29 and extends transversely of the frame 1 and is substantially the same length as the main shaft 12. Keyed to the extreme ends of the shaft 34 are driving pinions 35, each pinion being in constant mesh with the teeth of the associated main drive gear 8.

The shafts 28 and 29 have pulleys or fly wheels 37 and 38, respectively, mounted thereon for relative rotation about the axes thereof. These pulleys in turn are selectively drivingly connected to their associated shafts through clutches 39 and 40, respectively, the operation of which will later be described.

The fly wheel pulleys 37 and 38 are preferably driven continuously in opposite directions by means of the motor 10 through a belt 41, which passes around a pulley 42 on the motor 10 and engages the lower side of the pulley 38, thence around the upper side of the pulley 37, and returns to the pulley 42 from the lower side of the pulley 37. Thus when the pulley 42 of the motor 10 is revolving in a counterclockwise direction, as viewed from Fig. 1, the pulley 38 revolves clockwise and the pulley 37 revolves counterclockwise. The important feature lies in the arrangement of the belt and pulleys in such a manner as to effect a dual direction of drive for the main gears 8.

This simple arrangement of providing a reversible drive is considerably less expensive to manufacture and maintain and much more satisfactory to operate than prior gear type reversing drive mechanisms. Heretofore, as stated above, these reversing drives required the use of only one shaft, the two clutches and two bevel gears being mounted on the shaft for driving the same. The bevel gears were mounted in opposed relation to each other and were driven in opposite directions by means of a bevel pinion disposed intermediate the two gears and mounted on a shaft directed at right angles to the clutch shaft. This type of reversing drive was extremely expensive to build and maintain because the gears were very expensive and the teeth became worn rapidly by reason of the improper mesh with the pinion.

Figure 3:
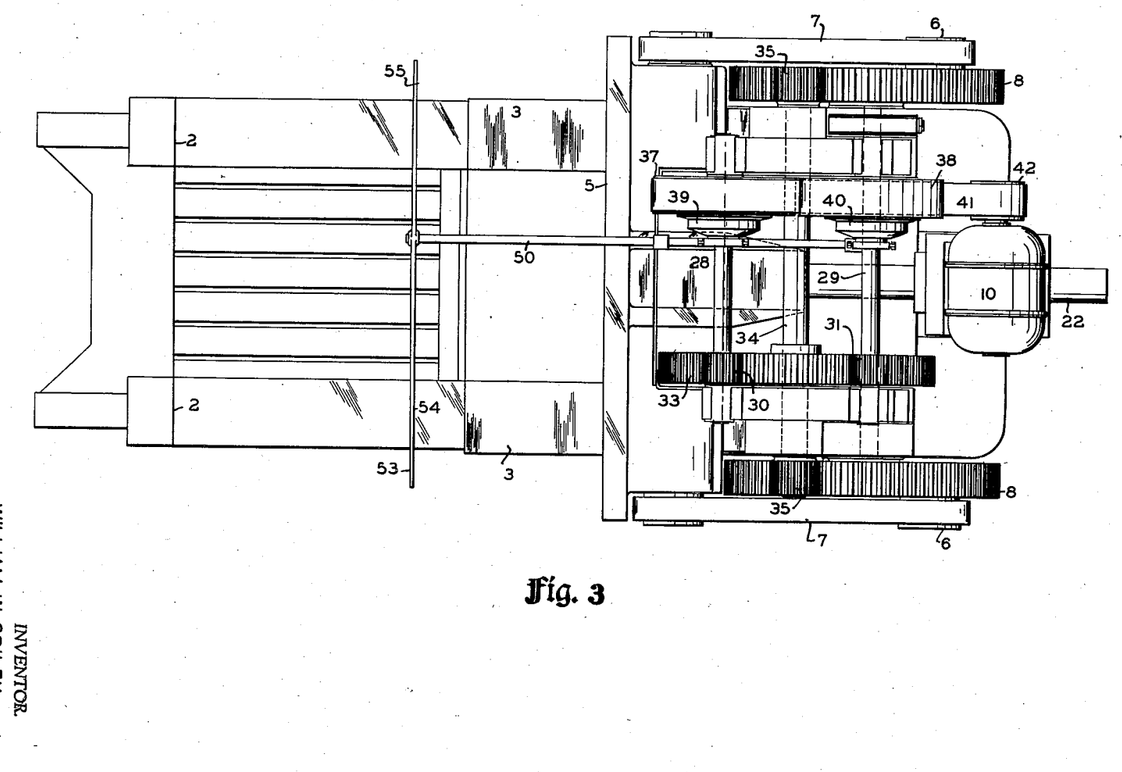
Fig. 3 is a top plan view of the machine illustrated in Fig. 1.
Figures 8, 10:
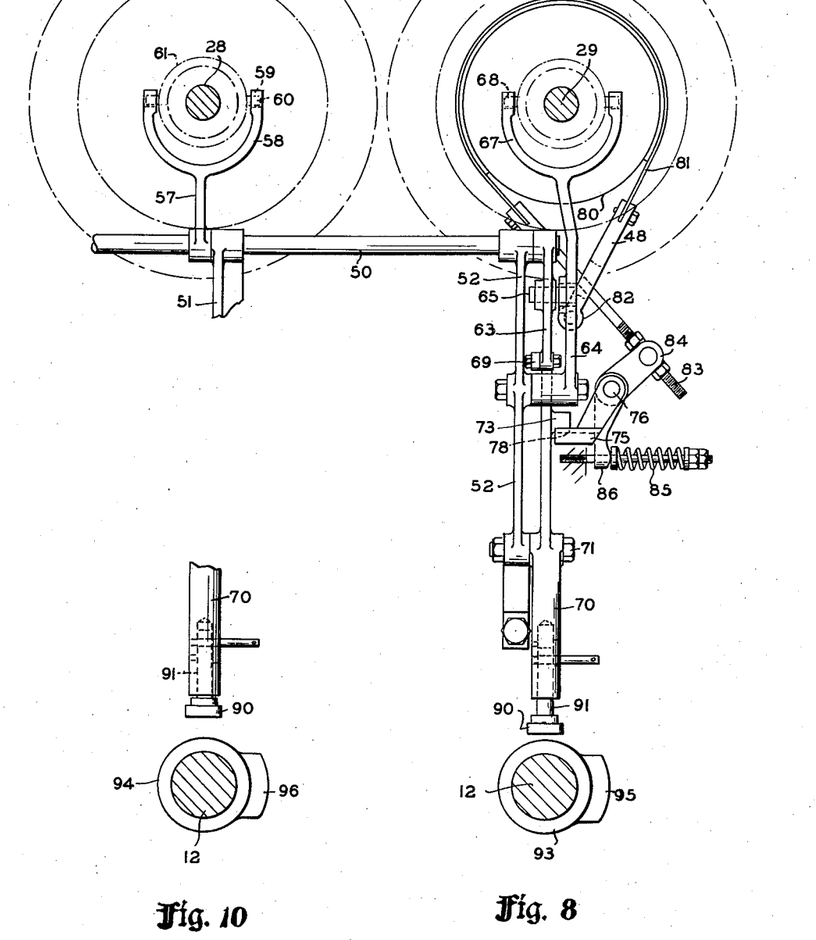
Fig. 8 is a side elevation of the clutch and brake operating mechanism.
Fig. 10 is a fragmentary side elevation, partly in section, supplementing Fig. 8, showing the disengaged position of the brake knockout roller with respect to brake knockout cams.

Figs. 8, 9 and 10 disclose the mechanism for controlling the operation of the forward and reversing clutches 39 and 40 and also a brake mechanism 48 from a single operating shaft 50. In the present instance, this operating shaft is mounted for oscillating movement on suitable brackets 51 and 52 which are rigid with the frame and are preferably disposed in close proximity with and slightly below the clutches 39 and 40, respectively. The operating shaft 50 extends horizontally and longitudinally of the frame and in a direction forwardly of the brackets, as shown in Figs. 1, 3 and 8.

Mounted on the extreme forward end of the operating shaft is a transverse operating lever 53 which is provided with opposed laterally extending arms 54 and 55. These arms, when moved in a vertical plane, turn the operating shaft 50 to control the operation of the clutches 39 and 40 and the brake mechanism 48. Thus when the arm 54 is moved upwardly, the forward clutch 39 is engaged to drivingly connect the pulley 37 with the shaft 28 for moving the slide in the forward or work-engaging direction. Movement of the arm 54 to a horizontal position disengages the clutch 39 and renders the brake mechanism 48 active to stop the slide. Downward movement of the arm 54 causes engagement of the reversing clutch 40 to drivingly connect the pulley 38 with the shaft 29.

In Fig. 8 the clutch and brake control mechanism is shown in neutral position, that is, when neither of the clutches is engaged and the brake mechanism is active. In Fig. 9, however, the clutch and brake control mechanism is shown in position for engaging the forward clutch 39, the brake mechanism 48 and the reversing clutch 40 being rendered inactive. Details of the mechanism which effect these operations will now be described.

Mounted on the operating shaft 50 and disposed directly beneath the shaft 28 is a lever 57 which extends upwardly toward the shaft 28. This lever is provided, at its upper end, with a bifurcated portion 58 having notches 59 cut in the extreme upper ends thereof, which engage pins 60 on an axially movable element 61 of the clutch 39. Thus it will be seen from Fig. 9 that movement of the lever 54 upwardly causes the lever 57 to move in a direction toward the clutch 39, effecting driving engagement of the pulley 37 with its shaft 28.

Also mounted on the shaft 50 and beneath the shaft 29 is a downwardly extending lever 63 which controls the operation of a reversing clutch operating lever 64. This reversing lever 64 is pivotally mounted on the frame of the machine at a position preferably directly below the lower end of the lever 63. The intermediate portions of the levers 63 and 64 are pivotally and slidably connected together by means of a pin 65. Thus, when the operating lever 54 is moved upwardly, the reversing clutch operating lever 64 is moved in a direction axially away from the associated clutch 40 to render the clutch inoperative, and movement of the operating lever 54 downwardly causes movement of the lever 64 toward the clutch 40 to effect driving engagement of the pulley 38 with the shaft 29.

The upper end of the lever 64 is also provided with a bifurcated portion 67 having slots 68 in the upper ends thereof which engage pins similar to the pins 60 which are operably connected with the clutch engaging member of the reversing clutch 40.

Thus, when the operating lever 53 is in a substantially horizontal position, the clutch operating levers 57 and 64 lie substantially in the same vertical plane, and when in this position, both clutches 39 and 40 are in disengaged relation to their respective shafts 28 and 29. It will be noted from this description that only one of the clutches can be in driving engagement with its associated shaft at one time.

As stated before, prior machines of this character have been provided with separate operating levers for each clutch. By providing the present machine with a single clutch and brake operating lever, the danger of causing concurrent engagement of both the forward and reversing clutches is eliminated.

When the operating lever 53 is in horizontal or neutral position, the brake mechanism 48 is rendered operative and all of the moving parts, which are operatively connected between the slide 5 and the shafts 28 and 29, are held stationary. The mechanism for operating the brake includes a horizontal rod 69 pivotally connected at one of its ends to the lowermost end of the lever 63. The opposite end of the rod 69 is pivotally connected to one end of a brake knock-out lever 70. In the present instance, this knock-out lever is pivoted near its center to a portion of the frame by means of a bolt 71. Carried near the upper end of the brake knock-out lever 70 is a roller 73 rotatable about a horizontal axis. This roller is preferably disposed between the pivot 71 and the upper end of the lever 70 and extends toward the rear of the machine. The roller 73 engages and actuates a brake operating lever 75 which is mounted for oscillation on a shaft 76. The brake operating lever 75 is provided with a roll engaging surface having a depression 78 substantially midway between opposite sides of the lever. When the roller 73 rests within the depression 78, as shown in Fig. 8, the brake mechanism 48 is rendered operative, but when the roller moves to one side or the other of the depression, as indicated in Fig. 9, the brake mechanism is released.

The brake mechanism 48 comprises a brake drum 80 which, in the present instance, is shown rigidly mounted on one end of the shaft 29. Embracing a part of this drum is a brake band 81 which is rigidly anchored at one end 82 to a suitable part of the frame and secured at the other end 83 to one arm 84 of a bell crank which is keyed on the shaft 76 and is positioned on the opposite end thereof from the brake operating lever 75. A spring 85, resiliently engaging the other arm 86 of the bell crank, urges the brake band into engagement or maintains the roll engaging surface of the brake operating lever 75 in pressure engagement with the roll 73. Thus it will be seen that when the depression 78 of the roll engaging surface is brought into alignment with the roll 73, the lever 75 and the shaft 76 are rotated slightly clockwise by the spring, as viewed from Fig. 8. This slight rotation of the shaft 76 and its attached levers 75 and arms 84 and 86 causes tightening of the brake band 81 on the brake drum 80 and the resultant stopping of the intermittently operating parts of the machine. The pressure of the band is regulated by the compression of the spring so as to cause the machine to stop on back dead center.

This brake mechanism is designed to operate whether the machine is running forwardly or backwardly. It has been stated before that prior machines have been equipped with a brake for the purpose of stopping the machine in one direction only.

The clutch and brake operating mechanism may be rendered automatic in its operation to stop the slide at its back stroke by means of the merchanism about to be described. The brake knock-out lever 70 extends downwardly from its pivot 71 in a direction toward the axis of the main shaft 12 and terminates a short distance therefrom, as shown in Figs. 8 and 9. The extreme lower end of the lever 70 carries therewith a roller 90 mounted on a member 91, which is extensible and retractable with respect to the end of the lever 70. Means may be provided for holding the roller 90 in extended or retracted position with respect to the end of the lever 70. When the roller is in extended position, as shown in Figs. 8 and 9, it lies between a pair of cams 93 and 94 which may be adjustably secured to the shaft 12. Each of these cams is provided with opposed cam surfaces 95 and 96, respectively. These cam surfaces are engageable with the roller 90 at a predetermined portion of the stroke of the slide to return the lever 70 to a position such that the roller 73 lies within the depression 78. In this position, as stated before, both clutches are disengaged and the brake mechanism is rendered operative to stop the machine whether the drive has been in the forward or reverse direction.

If it is desired to operate the machine entirely by manual control, the roller 90 and its member 91 may be moved to a retracted position away from the axis of the shaft 12 so that the roller will clear the peripheries of the cams 93 and 94. In this instance, the operator can control the movement and stopping of the slide entirely from the single operating lever 53.

While but one form of the invention has been herein shown and described, it will be apparent to those skilled in the art that other forms may be employed without departing from the spirit and scope of the invention as defined in the appended claims.

I claim:

1. A bulldozer comprising a rigid frame, a slideway on the frame, a slide reciprocable along and guided laterally by the slideway, spaced main cranks having a common rotatable axis disposed normal to the direction of reciprocation of the slide, spaced arms connecting the cranks and slide in spaced relation to each other, a rigid guide bar extending from the slide toward and beyond the rotatable axis of the cranks, a rigid guide bearing carried by the frame and positioned beyond the rotatable axis of the crank shaft from the slide and between the crank arms, and slidably accommodating the bar and constraining the bar and slide from tilting action relative to the slideway.

2. A bulldozer comprising a rigid horizontal frame, including a base and laterally spaced upright members thereon, horizontal slideways on said upright members, a slide reciprocable along said slideways, said upright members having portions at one end of the slideways extending above the level of the slideways, a transversely extending horizontal shaft journalled in said portions, said shaft having axially spaced eccentrics mounted thereon, laterally spaced crank arms connecting the eccentrics and slide, a rigid bar on the slide and extending therefrom longitudinally of the frame between the upright members to and beyond the shaft, a rigid guide bearing carried by the frame and positioned beyond the rotational axis of the shaft from the slide and between the crank arms and slidably accommodating the bar and constraining the bar and slide from tilting relative to the slideway.

3. A bulldozer comprising a rigid horizontal frame, including a base and laterally spaced upright members thereon, horizontal slideways on said upright members, a slide reciprocable along said slideways, said upright members having portions at one end of the slideways extending above the level of the slideways, a transversely extending horizontal shaft journalled in said portions, said shaft having axially spaced eccentrics mounted thereon, laterally spaced crank arms connecting the eccentrics and slide, a rigid bar on the slide and extending therefrom longitudinally of the frame between the upright members to and beyond the axis of the shaft, a transverse crown plate connecting said portions at the opposite side of the axis of said shaft from the slide, and a guide bearing rigidly mounted on the crown plate and slidably receiving said rigid bar for constraining the slide from tilting relative to the slideway.

4. A bulldozer comprising a rigid horizontal frame, including a base and laterally spaced upright members thereon, horizontal slideways on said upright members, a slide reciprocable longitudinally along said slideways, said slide being of less dimension longitudinally of the frame than it is transversely of the frame, said slideways being substantially equal to the length of stroke of the slide plus the longitudinal dimension of the slide, a transverse crank shaft mounted in said upright frame members and having a main drive gear positioned between the lateral limits of the slide, a bearing rigid with the frame and positioned between the upright frame members and on the opposite side of the crank shaft from the slide, and a rigid guide member secured to the slide and extending toward and beyond the crank shaft, said guide member being accommodated for guiding reciprocation within said rigid bearing.

WILLIAM W. CRILEY.